United States Patent
Deshpande et al.

(10) Patent No.: US 9,587,629 B2
(45) Date of Patent: Mar. 7, 2017

(54) METHODS AND SYSTEMS TO OPERATE A WIND TURBINE SYSTEM USING A NON-LINEAR DAMPING MODEL

(71) Applicant: General Electric Company, Schenectady, NY (US)

(72) Inventors: Ameet Shridhar Deshpande, Schenectady, NY (US); Pranav Agarwal, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 71 days.

(21) Appl. No.: 14/319,269

(22) Filed: Jun. 30, 2014

(65) Prior Publication Data

US 2015/0377213 A1    Dec. 31, 2015

(51) Int. Cl.
*F03D 7/00* (2006.01)
*F03D 7/02* (2006.01)
(Continued)

(52) U.S. Cl.
CPC ......... *F03D 7/0296* (2013.01); *F03D 7/0224* (2013.01); *F03D 9/002* (2013.01);
(Continued)

(58) Field of Classification Search
CPC ...... F03D 7/0296; F03D 7/0224; F03D 9/002; F03D 7/045; F05B 2260/821; F05B 2270/404; Y02E 10/723
See application file for complete search history.

(56) References Cited

U.S. PATENT DOCUMENTS 4,420,692 A * 12/1983 Kos ............... F03D 7/0224
290/44
4,435,647 A * 3/1984 Harner ............ F03D 7/0224
290/44
(Continued)

FOREIGN PATENT DOCUMENTS

EP    1770278 A2    4/2007
EP    2535574 A1    12/2012
(Continued)

OTHER PUBLICATIONS

Jelavić, Mate, et al. Damping of Wind Turbine Tower Oscillations through Rotor Speed Control. International Conference on Ecologic Vehicles & Renewable Energies. 2007.*
(Continued)

*Primary Examiner* — Tulsidas C Patel
*Assistant Examiner* — S. Mikailoff
(74) *Attorney, Agent, or Firm* — Ann M. Agosti

(57) ABSTRACT

A wind turbine system is presented. The wind turbine system includes a tower, a plurality of blades, a rotor supported by the tower and rotatably coupled to the plurality of blades, a control unit programmed to predict a net energy of the tower at one or more future points in time, and if the predicted net energy is within a design limit, then continue with baseline operating control models for normal operation of the wind turbine system, if the predicted net energy exceeds the design limit, then use a non-linear tower damping model to generate tower damping commands to control tower damping of the wind turbine system.

16 Claims, 6 Drawing Sheets

(51) Int. Cl.
*F03D 9/00* (2016.01)
*F03D 7/04* (2006.01)

(52) U.S. Cl.
CPC ........ *F03D 7/045* (2013.01); *F05B 2260/821* (2013.01); *F05B 2270/404* (2013.01); *Y02E 10/723* (2013.01)

(56) References Cited

U.S. PATENT DOCUMENTS

| | | | |
|---|---|---|---|
| 7,445,431 B2 | 11/2008 | Larsen et al. | |
| 7,942,634 B2 | 5/2011 | Christensen | |
| 8,174,137 B2 | 5/2012 | Skaare | |
| 8,301,310 B2 | 10/2012 | Nim | |
| 8,450,867 B2 | 5/2013 | Fukami et al. | |
| 2006/0033338 A1* | 2/2006 | Wilson | F03D 1/0608 290/44 |
| 2006/0066111 A1* | 3/2006 | Suryanarayanan | F03D 7/0272 290/44 |
| 2007/0176428 A1* | 8/2007 | Nagao | F03D 7/0296 290/44 |
| 2008/0067815 A1* | 3/2008 | Suryanarayanan | F03D 7/0272 290/44 |
| 2009/0263245 A1* | 10/2009 | Shi | F03D 7/02 416/43 |
| 2010/0111693 A1* | 5/2010 | Wilson | F03D 7/0224 416/1 |
| 2012/0009062 A1 | 1/2012 | Ingram et al. | |
| 2012/0139240 A1* | 6/2012 | Otamendi Claramunt | F03D 7/0224 290/44 |
| 2012/0193918 A1 | 8/2012 | Mascarell et al. | |
| 2013/0106107 A1* | 5/2013 | Spruce | F03D 7/0224 290/44 |
| 2013/0287567 A1* | 10/2013 | Olesen | F03D 7/0288 416/1 |
| 2015/0147173 A1* | 5/2015 | Agarwal | F03D 7/0244 416/1 |

FOREIGN PATENT DOCUMENTS

| | | |
|---|---|---|
| EP | 2623776 A2 | 8/2013 |
| EP | 2746576 A2 | 6/2014 |
| WO | 2007086930 A2 | 8/2007 |
| WO | 2007089136 A2 | 8/2007 |
| WO | 2010022735 A2 | 3/2010 |
| WO | 2010060772 A2 | 6/2010 |
| WO | 2011023588 A2 | 3/2011 |
| WO | 2012025121 A2 | 3/2012 |
| WO | 2013075720 A2 | 5/2013 |

OTHER PUBLICATIONS

Spruce et al., "Tower Vibration Control of Active Stall Wind Turbines", Control Systems Technology, IEEE Transactions on, Jul. 2013, pp. 1049-1066, vol. 21, Issue: 4.

Soltani et al., "Load reduction of wind turbines using receding horizon control", Control Applications (CCA), 2011 IEEE International Conference on, Sep. 28-30, 2011, pp. 852-857, Denver, CO.

Hammerum, "A Fatigue Approach to Wind Turbine Control", Technical University of Denmark, DTU, 2006, IMM-Thesis-2006, Lyngby, Denmark, 110 Pages.

European Search Report and Opinion issued in connection with corresponding EP Application No. 15171869.9 on Nov. 19, 2015.

\* cited by examiner

METHODS AND SYSTEMS TO OPERATE A WIND TURBINE SYSTEM USING A NON-LINEAR DAMPING MODEL

BACKGROUND

Embodiments of the present disclosure relate to wind turbines, and more particularly to reducing tower oscillations in wind turbines.

Wind turbines are increasingly gaining importance as renewable sources of energy generation. In recent times, wind turbine technology has increasingly been applied to large-scale power generation applications. A wind turbine typically includes a tower and a rotor rotatably coupled to two or more blades. Maximizing energy output while minimizing loads of the wind turbines in varied wind conditions is a challenge that exists in harnessing wind energy.

Tower oscillations or vibrations may cause significant loading of a wind turbine and may result from various disturbances such as turbulence, large and sudden gusts, inefficient damping, or transitions between wind conditions. A tower may vibrate along any degree of freedom. For example, the tower may vibrate in a fore-aft direction (commonly referred to as tower nodding), in a side-to-side direction (commonly referred to as tower naying), or along its longitudinal axis (commonly referred to as torsional vibration).

Tower nodding is usually caused by aerodynamic thrust and rotation of the blades. Every time a rotor blade passes in front of the tower, the thrust of the wind impinging on the tower decreases. Such continuous variation in wind force tends to induce oscillations in the tower. Moreover, if the rotor velocity is such that a rotor blade passes over the tower each time the tower is in one of its extreme positions (forward or backward), the tower oscillations may be amplified. Oscillations in the fore-aft direction are sometimes "automatically" minimized due to aerodynamic damping which relies on the fact that the top of the tower constantly oscillates in the fore-aft direction. When the top of the tower moves upwind (or forward), the rotor thrust is increased. This increase in rotor thrust pushes the tower back downwind. The downwind push in turn aids in dampening the tower oscillations. Similarly, when the top of the tower moves downwind, the rotor thrust may be decreased. This decrease in rotor thrust pushes the tower back upwind. The upwind push also aids in dampening the tower oscillations.

Although aerodynamic damping aids in reducing oscillations under many circumstances, if the rotor velocity is synchronized with the tower oscillations, the tower may oscillate at a high rate causing mechanical strain and possible damage to the tower. Moreover, such synchronization may amplify the rotor velocity at tower resonance frequency, thereby potentially damaging generators and/or drivetrains connected to the rotor blades. Even when the aerodynamic damping aides in reducing oscillations, the damping is a reactive technique that begins only after tower vibrations and oscillations have occurred. Therefore, a tower relying on this type of damping needs to be sturdy enough to sustain loads till aerodynamic damping techniques are activated. For reducing the cost of energy, it is expected that different types of towers and blades will be utilized. To enable flexibility in design, extreme loads needs be predicted and prevented.

Therefore, there is a need for an enhanced method and system for preventing occurrence of extreme loads in wind turbines.

BRIEF DESCRIPTION

In accordance with one embodiment, a wind turbine system includes a tower, a plurality of blades, a rotor supported by the tower and rotatably coupled to the plurality of blades, a control unit programmed to predict a net energy of the tower at one or more future points in time, and if the predicted net energy is within a design limit, then continue with baseline operating control models for normal operation of the wind turbine system, if the predicted net energy exceeds the design limit, then use a non-linear tower damping model to generate tower damping commands to control tower damping of the wind turbine system.

In accordance with another embodiment, a wind turbine system, includes a tower, a plurality of blades, a rotor supported by the tower and rotatably coupled to the plurality of blades, a control unit programmed to predict a tower-load-moment indicative parameter of the tower at one or more future points in time, and if the predicted tower-load-moment indicative parameter is within a design limit, then continue with baseline operating control models for normal operation of the wind turbine system, if the predicted tower-load-moment indicative parameter exceeds the design limit, then use a nonlinear tower damping model to generate tower damping commands to control tower damping of the wind turbine system.

In accordance with still another embodiment of the present techniques, a method of operating a wind turbine including predicting a net energy of a wind turbine tower at one or more future points in time, and if the predicted net energy is within a design limit, then use baseline operating control models for generating commands to control tower damping of the wind turbine system, if the predicted net energy exceeds the design limit, then use a nonlinear tower damping model to generate tower damping commands to control tower loads of the wind turbine system.

DRAWINGS

These and other features and aspects of embodiments of the present invention will become better understood when the following detailed description is read with reference to the accompanying drawings in which like characters represent like parts throughout the drawings, wherein.

Figure 5:
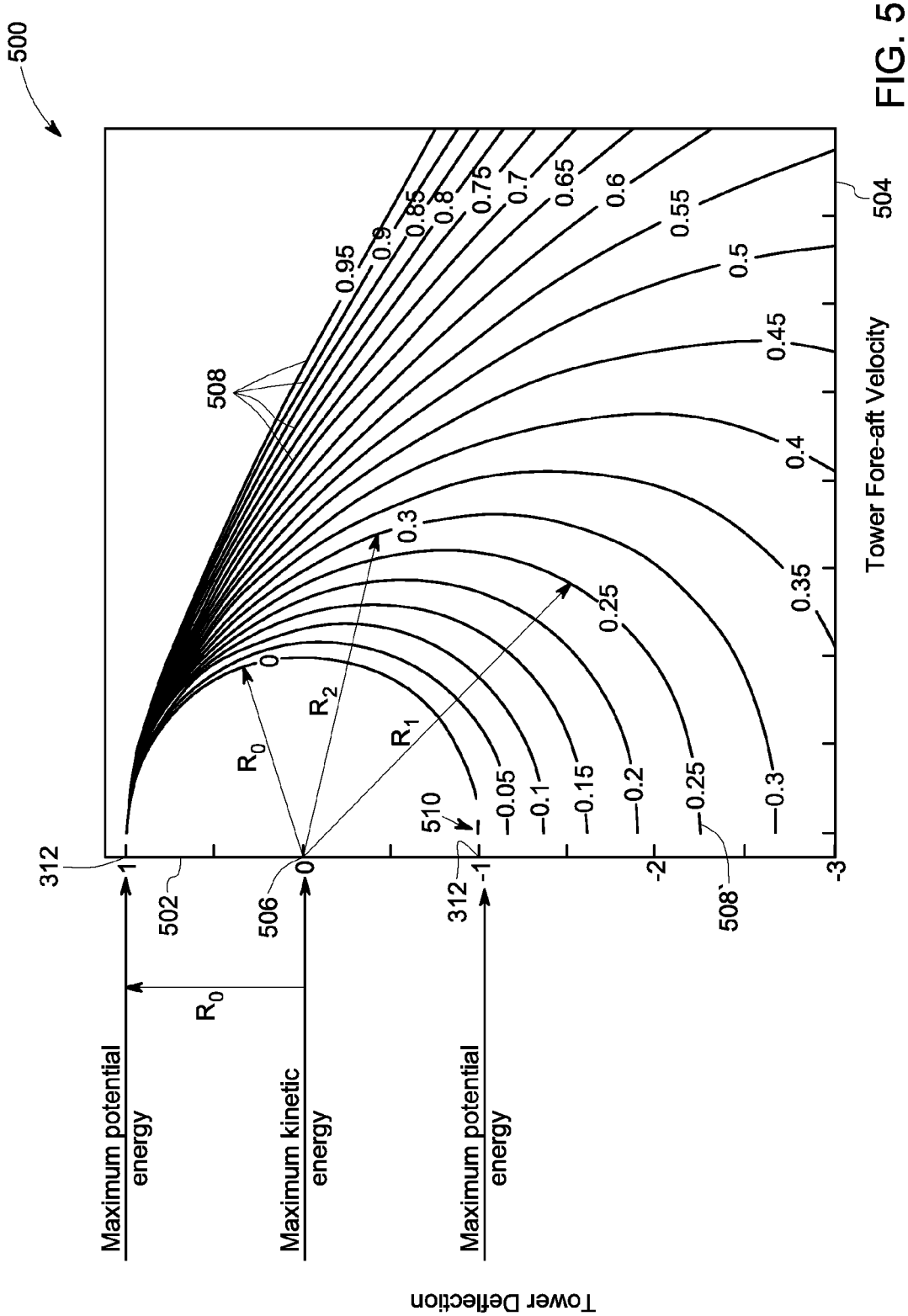
Figure 6:
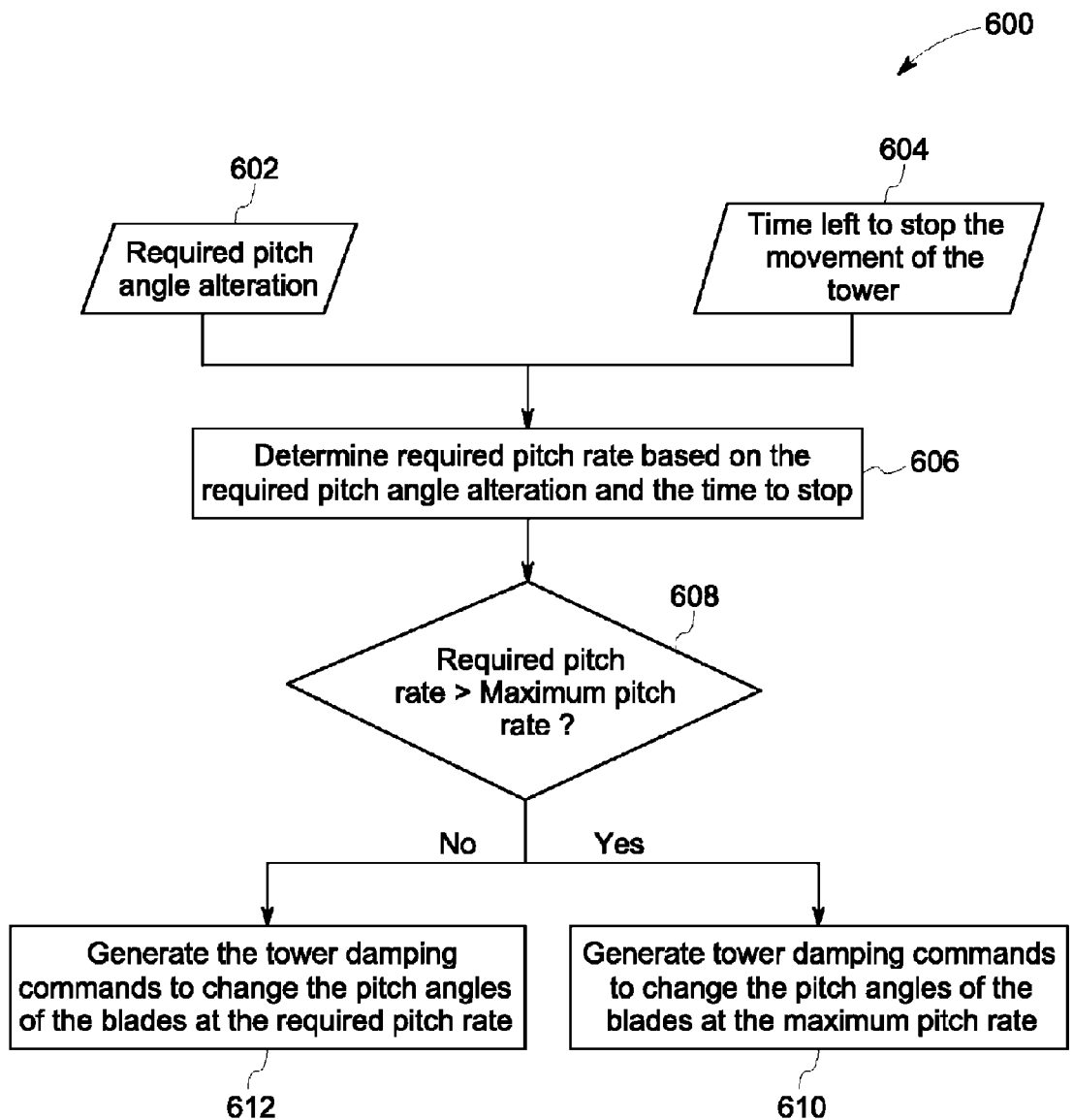

FIG. 5 shows an example of a half plane of a phase plane diagram that may be used to determine a non-linear variable damping coefficient, in accordance with one embodiment of the present disclosure; and FIG. 6 is a flow chart illustrating an example method to determine whether the tower damping commands satisfy pitch rate constraints and, if not, to modify the tower damping commands, in accordance with one embodiment of the present disclosure.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

Figure 1:
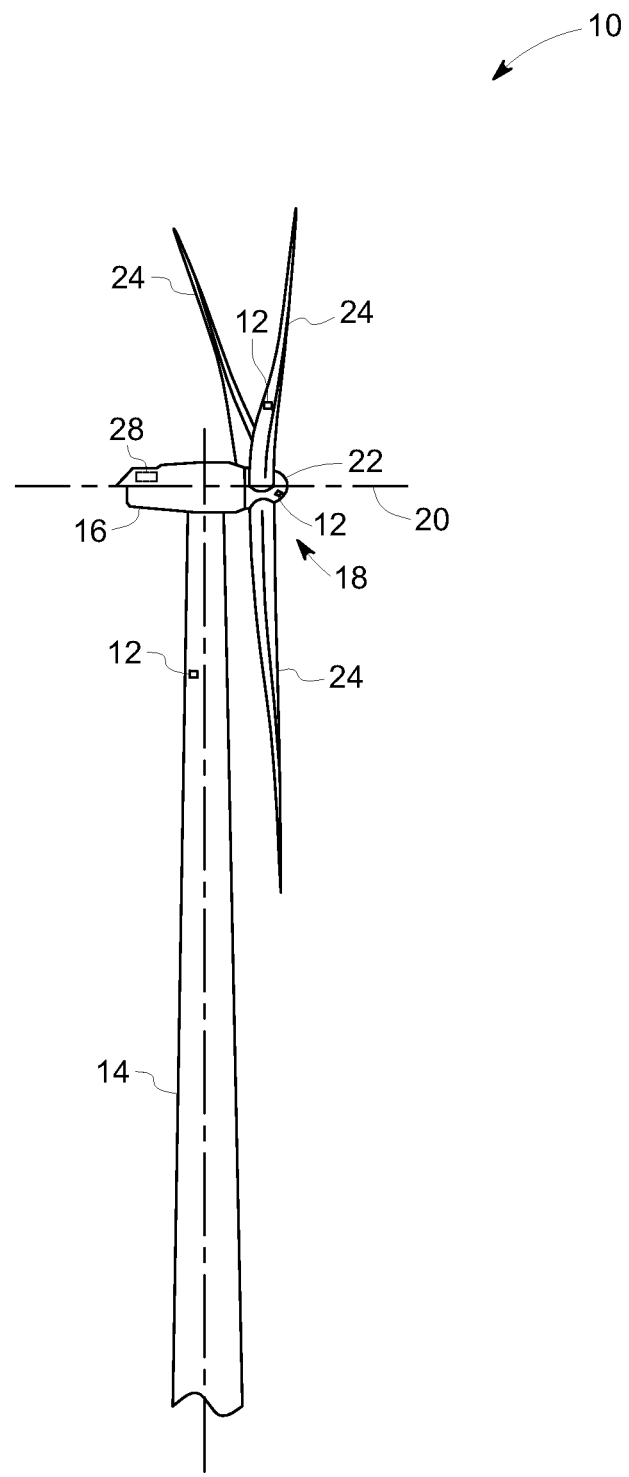
FIG. 1 is an exemplary representation of a wind turbine.

FIG. 1 is an exemplary representation of a wind turbine 10. Although the wind turbine 10 illustrated for purposes of example is a horizontal-axis electrical power generating wind turbine, in some embodiments, the wind turbine 10 may comprise a vertical-axis configuration and/or a wind mill type wind turbine (not shown). The wind turbine 10 may be coupled to a power grid (not shown) for receiving electrical power therefrom to drive operation of the wind turbine 10 and/or its associated components and/or for supplying electrical power generated by wind turbine 10 thereto. Although only one wind turbine 10 is shown, in some embodiments, a plurality of wind turbines 10 may be grouped together such that the group may be referred to as a "wind farm."

The wind turbine 10 includes a tower 14, a body 16 (sometimes referred to as a "nacelle") and a rotor 18 coupled to the body 16 for rotation with respect to the body 16 about an axis of rotation 20. The rotor 18 includes a hub 22 and one or more blades 24 extending radially outwardly from the hub 22 for converting wind energy into rotational energy. Although the rotor 18 is described and illustrated herein as having three blades 24, the rotor 18 may have any number of blades 24. The length of the blades 24 may vary depending on the application. In some embodiments, the rotor 18 generally faces upwind to harness the wind energy. In certain other embodiments, the rotor 18 faces downwind to harness the wind energy. In some embodiments, the rotor 18 may not face exactly upwind or downwind, but may be inclined generally at any angle (which may be variable) with respect to a direction of the wind to harness energy therefrom.

The rotor 18 may include the blades 24 of any shape, type, and configuration. For example, based on the shape, type, and configuration of the blades 24, the rotor 18 may include a ducted rotor, a darrieus wind turbine rotor, a savonious wind turbine rotor, a traditional windmill rotor, or the like. The traditional windmill rotor, for example may be for pumping water, such as, but not limited to, four-bladed rotors having wooden shutters and/or fabric sails.

The wind turbine 10 further includes one or more sensors 12 coupled to one or more components of the wind turbine 10 and/or the power grid, for measuring one or more parameters of such components. The sensors 12 may include, but are not limited to, sensors configured to measure current rotor speed, current rotor acceleration, current pitch angles of one or more of the blades 24, displacements, yaw, moments, strain, stress, twist, damage, failure, rotor torque, an anomaly in the power grid, generator speed, and/or an anomaly of power supplied to any component of the wind turbine 10.

The wind turbine 10 further includes one or more control systems 28 coupled to the sensors 12 and at least some of the components of wind turbine 10 for generally controlling operation of wind turbine 10. In the presently contemplated configuration, the control system 28 is disposed within the wind turbine 10. However, additionally or alternatively, the control system 28 may be remote from the wind turbine 10 and/or other components of the wind turbine 10. The control system 28 may be used for overall system monitoring and control including, for example, blade pitch and speed regulation, high-speed shaft and yaw brake applications, yaw and pump motor applications, and/or fault monitoring. Alternative distributed or centralized control architectures may be used in some embodiments.

Figure 2:
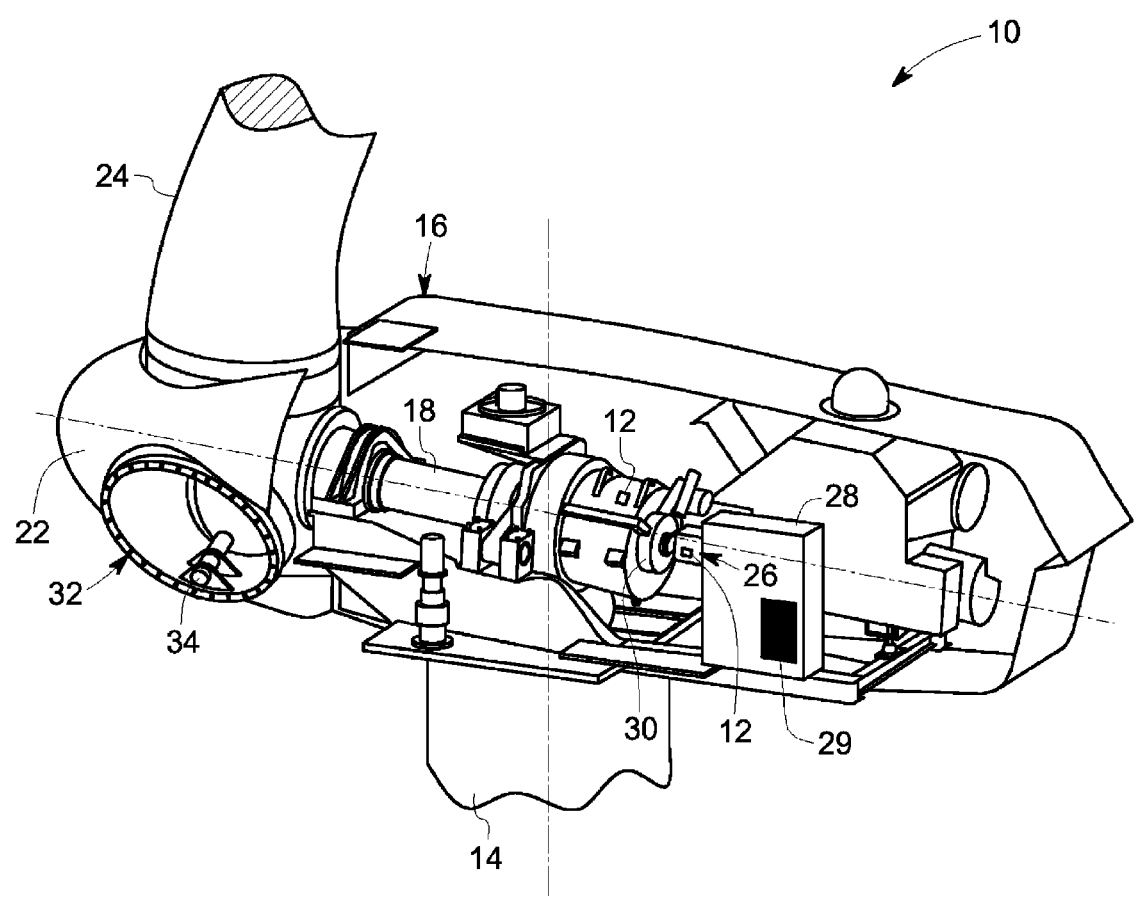
FIG. 2 is a partial-cut away perspective view of a portion of the wind turbine shown in FIG. 1.

FIG. 2 is a partial-cut away perspective view of a portion of the wind turbine 10 shown in FIG. 1. The wind turbine 10 includes one or more torque control devices. The torque control devices may include, for example, a converter, an electrical generator, a battery storage device, and/or a shunt resistor load. In one specific embodiment, the torque control device comprises an electrical generator 26 coupled to the rotor 18. The electrical generator 26 may optionally be coupled to the rotor 18 via a gearbox (not shown) and may comprise any suitable type of electrical generator, such as, but not limited to, a wound rotor induction generator. In some embodiments, the wind turbine 10 may include a brake 30 such as, for example, a hydraulic parking brake, an electromechanical brake, a centrifugal brake, an Eddie-current brake (retarder), or a magnetic brake, for braking rotation of the rotor 18 to, for example, slow rotation of the rotor 18, brake the rotor 18 against full wind torque, and/or reduce the generation of electrical power from the electrical generator 26.

The wind turbine 10 may further include a pitch control device, such as, a variable blade pitch system 32 for selectively controlling a pitch angle of the blades 24. In some embodiments, the pitch angles of the blades 24 are individually controlled by the variable blade pitch system 32. The variable blade pitch system 32 may include one or more actuators 34 coupled to the hub 22 and the blades 24 for changing the pitch angle of the blades 24. The actuators 34 may include but are not limited to, electrical motors, hydraulic cylinders, springs, and/or servo-mechanisms and may be driven by any suitable means, such as, but not limited to, hydraulic fluid, electrical power, electro-chemical power, and/or mechanical power. Additionally or alternatively, the actuators 34 may be driven by energy extracted from rotational inertia of the rotor 18, and/or a stored energy source (not shown) that supplies power to components of the wind turbine 10 during a grid anomaly in the power grid coupled to wind turbine 10.

As previously noted with reference to FIG. 1, the wind turbine 10 further includes the sensors 12 and the control system 28. The control system 28, for example, may be a processing subsystem, a processor, a microprocessor, an embedded chip, or the like. The control system 28 is operationally coupled to the brake 30 and the variable pitch controller 32. As previously noted with reference to FIG. 1, the sensors 12 are positioned with respect to one or more components of the wind turbine 10 and/or the power grid, for measuring one or more parameters of such components. Although the exemplary sensors 12 are illustrated herein as coupled to various components of wind turbine 10, including the tower 14, the plurality of blades 24, and the hub 22, the sensors 12 illustrated herein are not limited to the components each sensor is shown as coupled to, nor the location shown on such components. Rather, the sensors 12 may be coupled to any component of the wind turbine 10 and/or the power grid at any location thereof for measuring any parameter thereof.

The control system 28 predicts a tower-load-moment indicative parameter such as net energy of the tower 14 at one or more future points in time. The control system 28 includes a non-linear tower damping model 29 that is used by the control system 28 to generate tower damping commands to control tower damping of the wind turbine 10 when the predicted tower-load-moment indicative parameter exceeds the design limit. As herein, the term "non-linear tower damping model" refers to a mathematical model that uses a non-linear variable damping coefficient to generate tower damping commands for controlling tower damping of the tower 14 in the wind turbine 10. As used herein, the term "non-linear variable damping coefficient" refers to a coefficient that varies with a variation in: stress/load/deflection of the tower 14, an amount of energy dissipation required for controlling the tower damping, and/or time left to stop the movement of the tower 14 for controlling the tower damping the tower 14.

Figure 3:
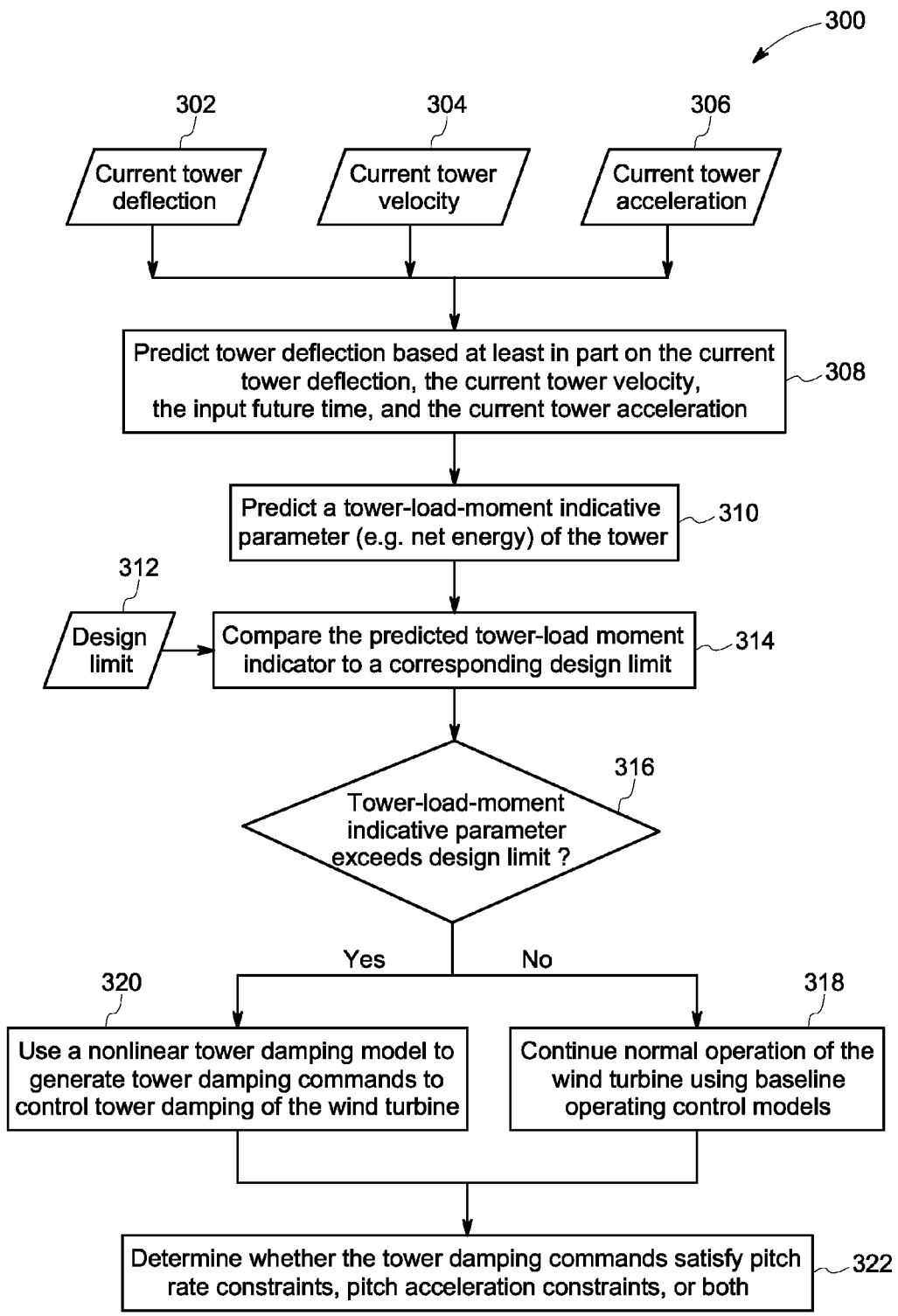
FIG. 3 is a flow chart illustrating a method to operate the wind turbine referred to in FIG. 1 and FIG. 2, in accordance with one embodiment of the present disclosure.

FIG. 3 is a flow chart illustrating a method 300 to operate the wind turbine 10 referred to in FIG. 1 and FIG. 2, in accordance with one embodiment of the present disclosure. Blocks of FIG. 3 may be executed by the control unit 28. Reference numeral 302 is representative of current tower deflection of the wind turbine tower 14. Reference numeral 304 is representative of current tower velocity 304 of the tower 14, and reference numeral 306 is representative of current tower acceleration. In one embodiment, the values in blocks 302, 304, and 306 may be computed based on information sensed by one or more of the sensors 12. For example, in one embodiment, the current tower deflection may be computed based upon information representative of tower base moment of the tower 14. In another embodiment, the current tower deflection can be computed from tower-top acceleration, tower-top thrust estimate, nodding and yawing moment.

At block 308, tower deflection of the tower 14 at one or more future points in time (T) is predicted based at least in part on the current tower deflection 302, the current tower velocity 304, and the current tower acceleration 306. The tower deflection, for example may be predicted using the following equation (1):

$$y_{predicted} = X_0 + \left(\overset{\circ}{X}_0 * T\right) + \left(\frac{1}{2}\overset{\circ\circ}{X}_0 * T^2\right) \quad (1)$$

wherein $y_{predicted}$ is the predicted tower deflection at an input future time T seconds, $\overset{\circ}{X}_0$ is the current fore-aft tower velocity, $X_0$ is the current fore-aft tower deflection, and $\overset{\circ\circ}{X}_0$ is the current fore-aft tower acceleration. The input future time T seconds, for example may be commanded by a user or the control unit 28. The tower deflection, for example, may be predicted by the control unit 28.

At block 310, a tower-load-moment indicative parameter may be predicted at one or more future points in time. As used herein, the term "tower-load-moment indicative parameter" refers to a parameter that is indicative of loads acting on the tower 14, and a comparison of the parameter with a preset threshold separates normal operation of the tower 14 from abnormally stressed tower operation. In one embodiment, the tower-load-moment indicative parameter is predicted based upon the predicted tower deflection. The tower-load-moment indicative parameter, for example may comprise net energy of the tower 14, potential energy of the tower 14, kinetic energy of the tower 14, bi-directional tower deflection, tower nodding, tower yawing or combinations thereof. The net energy includes net potential energy of the tower 14, net kinetic energy of the tower 14, or a total of the net potential and net kinetic energies. In one embodiment, the net energy is predicted based at least on the predicted tower deflection. In an alternative or additional embodiment, the net energy is predicted based at least in part on a tower deflection, tower velocity, and the natural frequency of the tower 14. For example, when the tower-load-moment indicative parameter is net energy, then the net energy may be predicted using the following equations (2) and (5):

$$R_{predicted} = \sqrt{(\omega Y_{dim})^2 + X_{dim}^2} \quad (2)$$

wherein $R_{predicted}$ is representative of total of the net potential and net kinetic energies of the tower 14, ω is the natural frequency of the tower 14, $Y_{dim}$ is a first dimensionless parameter that is ω times predicted dimensionless tower deflection, and $X_{dim}$ is a second dimensionless parameter that is a division of current dimensionless tower-fore aft velocity and the natural frequency. In one embodiment, the $R_{predicted}$ is representative of a radius of a phase plane diagram showed with reference to FIG. 5. The first dimensionless parameter $Y_{dim}$ may be represented by the following equation (3):

$$Y_{dim} = \omega \frac{y_{predicted} - Fz_{aero}/K}{y_{max} - Fz_{aero}/K} \quad (3)$$

wherein $y_{predicted}$ is a predicted tower deflection at the input future time T, K is tower modal stiffness and $Fz_{aero}$ is rotor thrust. Furthermore, the second dimensionless parameter $X_{dim}$ may be represented using the following equation (4):

$$X_{dim} = \frac{\overset{\circ}{X}_0}{\omega(y_{max} - Fz_{aero}/K)} \quad (4)$$

The equation (2) predicts the net energy using the first dimensionless parameter and the second dimensionless parameter. In one embodiment, the net energy may be predicted using dimensional parameters including the predicted tower deflection and the current tower fore-aft velocity using the following equation (5):

$$\text{Net Energy} = 0.5 * \left(K * \left(X_0 - \frac{Fz_{aero}}{K}\right)^2\right) + 0.5 * M * \overset{\circ}{X}_0^2 \quad (5)$$

wherein $X_0$ is current tower deflection or predicted tower deflection. Reference numeral 312 is representative of a design limit of the tower 14. As used herein, the term "design limit" refers to a design or a structural limitation of the tower 14. For example, the design limit 312 may include maximum potential energy stored in the tower 14, during operation of the wind turbine 10, at a maximum tower deflection limit of the tower 14. In another example, the design limit 312 may include the maximum tower deflection limit of the tower 14 or the maximum tower base moment beyond which the tower 14 may get damaged. It is noted that the design limit 312 of one wind turbine may be different from the design limit 312 of another wind turbine due to difference in design, structure, length, height, mass and other characteristics of the wind turbines. In one embodiment, the design limit 12 may be rated at the time of commissioning of the wind turbine 10, and such rated design limit 312 may change with time and usage of the wind turbine 10. The design limit 312 may additionally or alternatively include maximum potential energy of the tower 14, maximum net energy of the tower 14, maximum kinetic energy of the tower 14, maximum tower base moment, and/or maximum tower deflection.

At block 314, the predicted tower-load-moment indicator is compared to the corresponding design limit 312. When the predicted tower-load-moment indicator is the predicted net energy, then the predicted net energy is compared to the design limit 312 comprising the maximum net energy. The tower-load-moment indicative parameter is compared to the design limit 312 to ensure that the non-linear tower damping model 29 is used/activated only when extreme stress/loads/deflection on the tower 14 is imminent. Therefore, at block 316, when it is determined that the predicted tower-load moment indicator does not exceed the design limit 312, then at block 318 normal operation of the wind turbine 10 is continued using baseline operating control models. The baseline operating control models comprise any suitable control models and/or methods that are used for day-to-day normal operation of the wind turbine 10 when the wind turbine 10 is not experiencing loads/deflection/stress on the tower 14.

It is noted that when the predicted tower-load-moment indicator exceeds the corresponding design limit 312, it is indicative of the imminent extreme stress, loads, and/or deflection of the tower 14. When the predicted tower-load-moment indicator exceeds the corresponding design limit 312, then at block 320, the control unit 28 uses the non-linear tower damping model 29 to generate tower damping commands for controlling the tower damping of the tower 14 in the wind turbine 10. Accordingly, the non-linear tower damping model 29 is used/activated only when extreme stress/loads/deflection on the tower 14 is imminent. In one specific embodiment, the nonlinear tower damping model 29 is configured to generate the tower damping commands based at least in part on the non-linear variable damping coefficient, a mass of the tower, a direction of movement of the tower, an aerodynamic sensitivity, and the angular tower velocity. In one embodiment, the nonlinear tower damping model 29 is configured to generate the tower damping commands in phase with a tower velocity of the tower, and the tower damping commands include a required pitch angle alteration command for the blades 24. For example, when the tower damping command includes the required pitch angle alteration command, then the required pitch angle alteration for the blades 24 may be determined using the following equation (6):

$$\theta_{add} = \varsigma * \omega * \dot{X}_0 * M \Big/ \left(\frac{\partial Fz_{Aero}}{\partial \theta}\right) \quad (6)$$

wherein $\theta_{add}$ is tower damping command or required pitch angle alteration command, $\varsigma$, is non-linear variable damping coefficient, $\dot{X}_0$ is current velocity or predicted velocity of the tower, M is the modal mass of the tower 14, $\frac{\partial Fz_{Aero}}{\partial \theta}$ is the sensitivity of aerodynamic thrust with pitch angle, $Fz_{Aero}$ is rotor thrust and $\omega$ is natural frequency of the tower 14. The required pitch angle alteration for the blades 24, for example, may include a collective pitch alteration that satisfies pitch rate constraints, pitch acceleration constraints, or both of the wind turbine 10. The required pitch angle alteration for the blades 24 may comprise the same command for each blade 24 or may comprise an independent pitch angle command for each of the blades 24.

Furthermore, at block 322, it may be determined whether the tower damping commands satisfy pitch rate constraints and/or pitch acceleration constraints of the wind turbine 10. The pitch rate constraints, for example, may include maximum pitch rate capability of the variable blade pitch system 32 and the actuators 34. The pitch acceleration constraints, for example, may include maximum pitch acceleration capability of the variable blade pitch system 32 and the actuators 34. Determining whether the damping commands satisfy pitch rate constraints or pitch acceleration constraints of the wind turbine 10, in accordance with one embodiment, is explained in greater detail with reference to FIG. 6.

Figure 4:
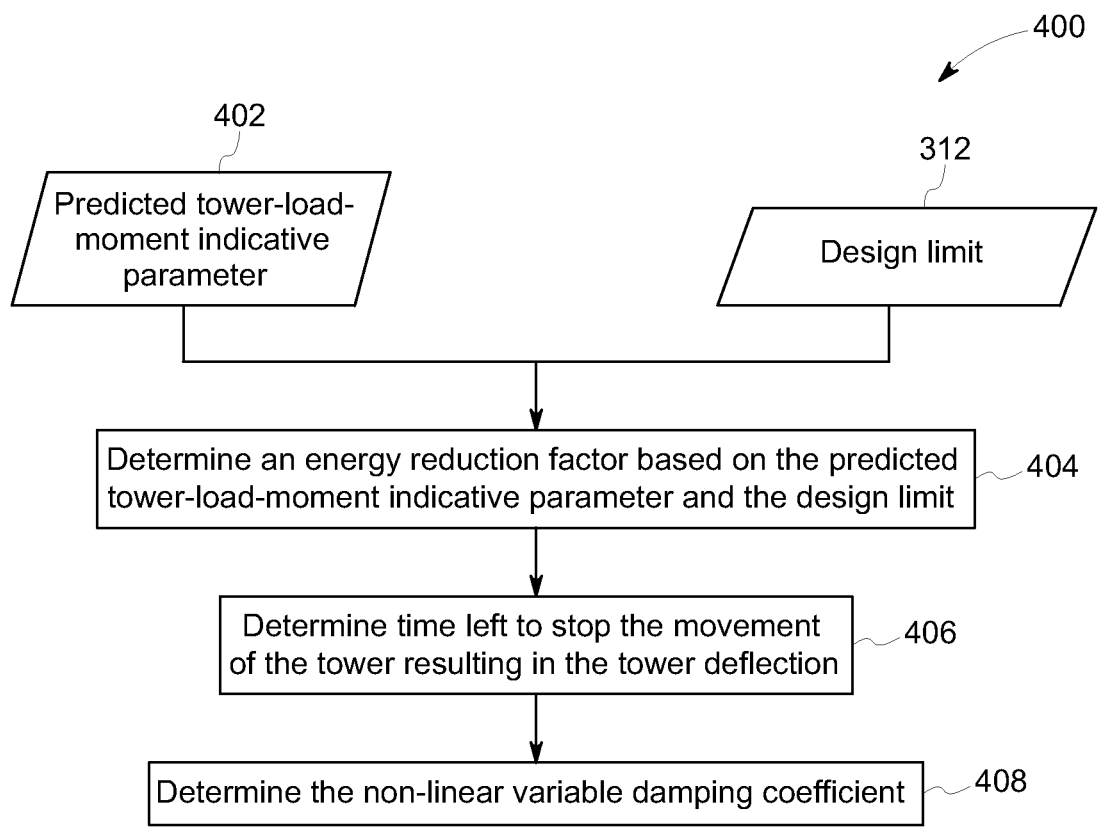
FIG. 4 is a flow chart illustrating a method to determine a non-linear variable damping coefficient that is generated by a non-linear tower damping model, in accordance with one embodiment of the present disclosure.

FIG. 4 is a flow chart illustrating a method 400 to determine the non-linear variable damping coefficient that is generated by the non-linear tower damping model 29, in accordance with one embodiment of the present disclosure. Reference numeral 402 is representative of predicted tower-load-moment indicative parameter that is predicted at the block 310 in FIG. 3. Furthermore, as previously noted with reference to FIG. 3, reference numeral 312 is representative of design limit of the tower 14.

At block 404, an energy reduction factor may be determined based upon the predicted tower-load-moment indicative parameter 402 and the design limit 312. In one embodiment, when the predicted tower-load-moment indicative parameter 402 is the predicted net energy of the tower 14, then the energy reduction factor may be determined based upon the predicted net energy and the design limit 312 namely the maximum net energy of the tower 14 at the maximum tower deflection limit of the tower 14. For example, the energy reduction factor may be determined using the following equation (7):

$$E_{ratio} = P_{tower-load}/P_{design\ limit} \quad (7)$$

wherein $E_{ratio}$ is the energy reduction factor, $P_{tower-load}$ is predicted tower-load-moment indicative parameter 402, and $P_{design\ limit}$ is the design limit 312. In one embodiment, when the predicted tower-load-moment indicative parameter 402 is the net energy ($R_{predicted}$), and the corresponding design limit 312 is the maximum potential energy ($R_{max}$) of the tower 14 at the maximum tower deflection limit, then the energy reduction factor $E_{ratio}$ may be determined using the following equation (8):

$$E_{ratio} = R_{predicted}/R_{max} \quad (8)$$

At block 406, a time left to stop the movement of the tower 14 resulting in tower deflection of the tower 14 is determined. As used herein, the phrase "time left to stop" refers to a maximum time period since current time before which if the movement of the tower 14 is not stopped, then the tower 14 may get damaged. For example, in one embodiment, the time left to stop the movement of the tower 14 may be determined using the following equations (9) and (10):

$$\theta_{predicted} = \tan^{-1}\left(\frac{\omega X_{dim}}{Y_{dim}}\right) \quad (9)$$

wherein $\theta_{predicted}$ is an angular representation of the time left to stop the movement of the tower 14, and also is angle formed on a phase plane diagram (shown in FIG. 5) between tower state including tower deflection and tower fore-aft velocity and a reference X-axis, $Y_{dim}$ is the first dimensionless parameter determined in the equation (4) and $X_{dim}$ is the second dimensionless parameter determined in the equation (3). The $\theta_{predicted}$ may be used to determine to the time left to stop the movement of the tower using the following equation (10):

$$T_{left} = \frac{\theta_{predicted}}{\omega} \quad (10)$$

wherein $T_{left}$ is time left to stop the movement of the tower and ω is natural frequency of the tower 14. At block 408, the non-linear variable damping coefficient that is a function of the energy reduction factor and the time left to stop the movement of the tower 14 may be determined. In one embodiment, the non-linear variable damping coefficient may be determined by solving a function based upon the time left to stop the movement of the tower 14 and the energy reduction factor. The function, for example, may be determined by solving a two-point boundary value optimization problem. The two-point boundary value optimization problem, for example, may be solved for a tower trajectory on a phase-plane diagram, wherein a tower trajectory starts from a current tower position and a current tower velocity, and ends at a tower deflection design limit and zero tower velocity, and assuming constant damping throughout. The solution may map each tower trajectory to the non-linear variable damping coefficient, which is a 2-dimensional scalar function of tower deflection and tower velocity.

The function may alternatively or additionally be parameterized by the energy reduction ratio and the time left to stop movement of the tower 14. The function parameterized by the energy reduction factor and the time left to stop movement of the tower may be solved numerically to determine the non-linear variable damping coefficients that may look like contour labels as shown in FIG. 5. The non-linear variable damping coefficient may be stored as a look-up table with non-dimensional inputs and used online. In alternative embodiment, the non-linear variable damping coefficient may be determined based on an approximating function. For example, the non-linear variable damping coefficient may be determined by solving the following approximating function shown by equation (11):

$$\varsigma(\theta_{predicted}, E_{ratio}) = \max\left(0, \min\left(1, \frac{(\Pi/2)^3}{2} * \frac{\ln(E_{ratio})}{(\theta_{predicted} - \Pi/2)^3}\right)\right) \quad (11)$$

wherein ζ is non-linear variable damping coefficient, $\theta_{predicted}$ is an angular representation of the time left to stop the movement of the tower 14, and $E_{ratio}$ is energy reduction factor.

In one embodiment, the non-linear variable damping coefficient may be determined based on a look up table that maps the time left to stop the movement of the tower 14 and the energy reduction factor to the non-linear variable damping coefficient. For example, the look up table may be generated by solving the function of equation (11) for various possible values of the time left to stop the movement of the tower 14 and the energy reduction factor.

In one embodiment, the nonlinear tower damping model 29 may determine the non-linear variable damping coefficient based on a phase plane diagram. FIG. 5 shows an example of a half plane 500 of a phase plane diagram that may be used to determine the non-linear variable damping coefficient, in accordance with one embodiment. For purposes of illustration, only the half plane 500 of the phase plane diagram is shown in FIG. 5. The other half plane (not shown) is anti-symmetric to the shown half plane 500. In the presently contemplated configuration, Y-axis 502 represents a dimensional or dimensionless tower deflection and the X-axis 504 represents a dimensional or dimensionless tower fore-aft velocity. In one embodiment, Y-axis 502 represents the first dimensionless parameter determined in equation (3), and X-axis 504 represents the second dimensionless parameter determined in equation (4).

Reference numeral 312 shown on the Y-axis 502 represents maximum tower deflection limit of a wind turbine tower deflected in a downwind direction (+1) and an upwind direction (−1). Radius of various semicircles 508 in the half plane 500 represent net energy of towers, and various numbers written on the boundary lines of the semicircles represent non-linear variable damping coefficients. The radius $R_0$ of the innermost semicircle 508 represents maximum net energy as the design limit 312 of the tower, and therefore the non-linear variable coefficient noted on the innermost semicircle is equal to 0 (shown by reference numeral 510). As is evident from the semicircles 508, a change in the radius (net energy) of the semicircles 508 and the tower fore-aft velocity changes the non-linear tower damping coefficient noted on each of corresponding semicircle 508. For example, when a radius of a semicircles 508 is $R_1$, then non-linear tower damping coefficient is equal to 0.25, and when the radius of the semicircle 508' is $R_2$, then the non-linear tower damping coefficient is equal to 0.3.

In one embodiment, the predicted net energy is mapped on to the phase plane diagram to determine the non-linear variable damping coefficient. In another embodiment, the predicted tower deflection and the current tower-fore aft velocity are mapped onto the phase plane diagram to determine the non-linear variable damping coefficient.

The damping/loads/stress of the tower 14 may be controlled by dissipating at least a portion of the net energy of the tower 14. The net energy of the tower 14, for example, may be dissipated by pitching the blades in phase with the tower velocity. Thus, whenever the tower stops moving and the tower velocity is zero, the pitch alteration/addition may be close to zero. If the pitch control device, such as the variable blade pitch system 32 or the actuators 34, is limited by a maximum pitch rate, and if too aggressive pitch rate is demanded when the tower is moving, the pitch may not be able to revert to zero in the time left to stop the movement of the tower 14, and will increase the net energy of the tower 14 instead of decreasing the net energy of the tower 14. Hence it is desirable to limit the aggressiveness of non-linear tower damping if maximum pitch rate and maximum pitch acceleration are low. FIG. 6 is a flow chart illustrating an example method 600 to determine whether the tower damping commands satisfy pitch rate constraints and, if not, to modify the tower damping commands. Reference numeral 602 is representative of required pitch angle alteration in the blades 24. As previously noted with reference to FIG. 3, the tower damping commands may include the required pitch angle alteration command 602. Reference numeral 604 is representative of time to stop the movement of the tower 14. At block 606, a required pitch rate is determined based upon the required pitch angle alteration 602 and the time left 604 to stop the movement of the tower 14. The required pitch rate, for example, may be determined using the following equation (12):

$$\theta_{rate} = \frac{\theta_{add}}{T_{left}} \qquad (12)$$

wherein $\theta_{rate}$ is required pitch rate to achieve the required pitch alteration by the time left to stop the tower 14, $\theta_{add}$ is tower damping command or required pitch angle alteration command, and $T_{left}$ is time left to stop the movement of the tower 14. At block 608, a check is carried out to determine whether the required pitch rate is greater than a maximum pitch rate of a pitch control device, such as the variable blade pitch system 32 or the actuators 34. As used herein, the term "maximum pitch rate" refers to a rated/maximum rate of change of pitch angles that can be achieved by the pitch control device. When it is determined that the required pitch rate is greater than the maximum pitch rate, then at block 610, the tower damping pitch commands are generated to change the pitch angle of the blades 24 at the maximum pitch rate to achieve the required pitch angle alteration in the pitch angles of the blades 24. On the contrary, when it is determined that the required pitch rate is less than or equal to the maximum pitch rate, then at block 612, the tower damping commands are generated to change the pitch angles of the blades 24 at the required pitch rate to achieve the required pitch angle alteration in the pitch angles of the blades 24.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine system, comprising:
  a tower having at least one sensor mounted thereon;
  a plurality of blades;
  a rotor supported by the tower and rotatably coupled to the plurality of blades;
  a control unit programmed to:
    determine a current deflection of the tower, a current fore-aft velocity of the tower, and a current acceleration of the tower based on information sensed by the at least one sensor;
    determine a predicted deflection of the tower as a function of the current deflection of the tower, the current fore-aft velocity of the tower and the current acceleration of the tower;
    determine a predicted tower-load-moment indicative parameter of the tower, wherein the predicted tower-load-moment indicative parameter comprises a predicted net energy of the tower, where a net energy of the tower includes a net potential energy of the tower, a net kinetic energy of the tower, or a total of the net potential energy of the tower and the net kinetic energy of the tower; and
    compare the predicted tower-load-moment indicative parameter of the tower to a design limit,
  wherein, if the predicted tower-load-moment indicative parameter is within the design limit, then a baseline operating control model is used by the control unit for normal operation of the wind turbine system; and
  wherein, if the predicted tower-load-moment indicative parameter exceeds the design limit, then a non-linear tower damping model is used by the control unit to determine a non-linear variable damping coefficient to prevent damage to the tower; and
  wherein the non-linear damping model is configured to generate a tower damping command in phase with the current fore-aft velocity of the tower; and
  wherein the tower damping command comprises a blade pitch angle alteration command.

2. The wind turbine system of claim 1, wherein the blade pitch angle alteration command is determined by the following equation:

$$\theta_{add} = \zeta * \omega * \dot{X}_0 * M \Big/ \left( \frac{\partial Fz_{Aero}}{\partial \theta} \right)$$

where,
  $\theta_{add}$ is the blade pitch angle alteration command;
  $\zeta$ is the non-linear variable damping coefficient;
  $\phi$ is a natural frequency of the tower;
  $\dot{X}_0$ is the current fore-aft velocity of the tower;
  M is a modal mass of the tower;
  $Fz_{Aero}$ is an aerodynamic rotor thrust; and $$\frac{\partial Fz_{Aero}}{\partial \theta}$$

is a sensitivity of the aerodynamic rotor thrust with respect to a pitch angle, $\theta$, of the plurality of blades.

3. The wind turbine system of claim 2, wherein the blade pitch angle alteration command comprises a collective pitch angle alteration command for all of the plurality of blades.

4. The wind turbine system of claim 2, wherein the blade pitch angle alteration command comprises an individual pitch angle alteration command for each of the plurality of blades.

5. The wind turbine system of claim 1, wherein the blade pitch angle alteration command is determined by the following equation:

$$\theta_{add} = \frac{\theta_{rate}}{T_{left}}$$

where,
  $\theta_{add}$ is the blade pitch angle alteration command;
  $\theta_{rate}$ is a pitch rate to prevent damage to the tower; and
  $T_{left}$ is a remaining amount of time before damage occurs to the tower.

6. A wind turbine system, comprising:
  a tower having at least one sensor mounted thereon;
  a plurality of blades;
  a rotor supported by the tower and rotatably coupled to the plurality of blades;
  a control unit programmed to:
    determine a current fore-aft deflection of the tower, a current fore-aft velocity of the tower, and a current fore-aft acceleration of the tower based on information sensed by the at least one sensor;
    determine a predicted deflection of the tower as a function of the current fore-aft deflection of the tower, the current fore-aft velocity of the tower and the current acceleration of the tower;

determine a predicted net energy of the tower, wherein a net energy of the tower comprises a net potential energy of the tower, a net kinetic energy of the tower, or a total of the net potential energy of the tower and the net kinetic energy of the tower; and compare the predicted net energy of the tower to a design limit, wherein, if the predicted net energy is within the design limit, then a baseline operating control model is used by the control unit for normal operation of the wind turbine system; and wherein, if the predicted net energy exceeds the design limit, then a non-linear tower damping model is used by the control unit to determine a non-linear variable damping coefficient to prevent damage to the tower, wherein the non-linear variable damping coefficient is a function of an energy reduction factor and a remaining amount of time before damage occurs to the tower, wherein the energy reduction factor is determined using the following equation:

$$E_{ratio} = R_{predicted} / R_{max}$$

where, $E_{ratio}$ is the energy reduction factor;
$R_{predicted}$ is the predicted net energy of the tower; and
$R_{max}$ is the design limit.

7. The wind turbine system of claim 6, wherein the design limit, $R_{max}$, comprises a maximum potential energy of the tower at a maximum tower deflection limit of the tower.

8. The wind turbine system of claim 6, wherein the predicted net energy is determined by the following equation:

$$R_{predicted} = \sqrt{(\omega Y_{dim})^2 + X_{dim}^2}$$

where, $R_{predicted}$ is the predicted net energy of the tower;
$\omega$ is a natural frequency of the tower;
$Y_{dim}$ is a first dimensionless parameter; and
$X_{dim}$ is a second dimensionless parameter.

9. The wind turbine system of claim 8, wherein the first dimensionless parameter, $Y_{dim}$, is determined by the following equation:

$$Y_{dim} = \omega \frac{y_{predicted} - Fz_{aero}/K}{y_{max} - Fz_{aero}/K}$$

where, $y_{predicted}$ is the predicted tower deflection;
K is a modal stiffness of the tower;
$y_{max}$ is a maximum deflection of the tower in a fore-aft direction; and
$Fz_{aero}$ is aerodynamic rotor thrust, and wherein the second dimensionless parameter, $X_{dim}$, is determined by the following equation:

$$X_{dim} = \frac{\dot{X}_0}{\omega(y_{max} - Fz_{aero}/K)}$$

where $X_0$ is the current fore-aft deflection of the tower;
$\dot{X}_0$ is the current fore-aft velocity of the tower; and
$\omega$ is the natural frequency of the tower.

10. The wind turbine system of claim 6, wherein the predicted net energy is determined by the following equation:

$$\text{Net Energy} = 0.5 * \left( K * \left( X_0 - \frac{Fz_{aero}}{K} \right)^2 \right) + 0.5 * M * \dot{X}_0^2$$

where,

Net Energy is the predicted net energy;
K is a modal stiffness of the tower;
$X_0$ is the current fore-aft deflection of the tower;
$\dot{X}_0$ is the current fore-aft velocity of the tower;
$Fz_{aero}$ is an aerodynamic rotor thrust; and
M is a modal mass of the tower.

11. The wind turbine system of claim 6, wherein the remaining amount of time before damage occurs to the tower is determined by the following equation:

$$T_{left} = \frac{\theta_{predicted}}{\omega}$$

where, $T_{left}$ is the remaining amount of time before damage occurs to the tower;
$\theta_{predicted}$ is an angular representation of the remaining amount of time before damage occurs to the tower; and
$\omega$ is a natural frequency of the tower.

12. The wind turbine system of claim 11, wherein the angular representation of the remaining amount of time before damage occurs to the tower, $\theta_{predicted}$, is determined by the following equation:

$$\theta_{predicted} = \tan^{-1}\left( \frac{\omega X_{dim}}{Y_{dim}} \right)$$

where, $Y_{dim}$ is a first dimensionless parameter; and
$X_{dim}$ is a second dimensionless parameter.

13. The wind turbine system of claim 12, wherein the first dimensionless parameter, $Y_{dim}$, is determined by the following equation:

$$Y_{dim} = \omega \frac{y_{predicted} - Fz_{aero}/K}{y_{max} - Fz_{aero}/K}$$

where, $y_{predicted}$ is a predicted deflection of the tower;
K is a modal stiffness of the tower;
$y_{max}$ is a maximum deflection of the tower;
$Fz_{aero}$ is an aerodynamic thrust of the rotor, and wherein the second dimensionless parameter, $X_{dim}$, is determined by the following equation:

$$X_{dim} = \frac{\dot{X}_0}{\omega(y_{max} - Fz_{aero}/K)}$$

where, $X_0$ is the current fore-aft deflection of the tower; and
$\dot{X}_0$ is the current fore-aft velocity of the tower.

14. The wind turbine system of claim 13, wherein the predicted deflection of the tower is determined by the following equation:

$$y_{predicted} = X_0 + \left(\overset{\circ}{X_0} * T\right) + \left(\frac{1}{2}\overset{\circ\circ}{X_0} * T^2\right)$$

where,
T is a future time (sec); and
$\overset{..}{X_0}$ is the current fore-aft acceleration of the tower.

15. The wind turbine system of claim 6, wherein the non-linear damping coefficient, $\zeta$, is determined by the following equation:

$$\zeta(\theta_{predicted}, E_{ratio}) = \max\left(0, \min\left(1, \frac{(\Pi/2)^3}{2} * \frac{\ln(E_{ratio})}{(\theta_{predicted} - \Pi/2)^3}\right)\right)$$

where,
$\theta_{predicted}$ is an angular representation of the remaining amount of time before damage occurs to the tower; and
$E_{ratio}$ is the energy reduction factor.

16. A method of operating a wind turbine system, the wind turbine system comprising a tower having at least one sensor mounted thereon, a plurality of blades, a rotor supported by the tower and rotatably coupled to the plurality of blades, and a control unit; the method comprising:

determining, in the control unit of the wind turbine system, a current fore-aft deflection of the tower, a current fore-aft velocity of the tower, and a current fore-aft acceleration of the tower based on information sensed by the at least one sensor of the wind turbine system;

determining, in the control unit of the wind turbine system, a predicted deflection of the tower as a function of the current fore-aft deflection of the tower, the current fore-aft velocity of the tower and the current fore-aft acceleration of the tower;

determining, in the control unit of the wind turbine system, a predicted tower-load-moment indicative parameter of the tower, wherein the predicted tower-load-moment indicative parameter comprises a predicted net energy of the tower, where a net energy of the tower includes a net potential energy of the tower, a net kinetic energy of the tower, or a total of the net potential energy of the tower and the net kinetic energy of the tower; and comparing the predicted tower-load-moment indicative parameter of the tower to a design limit, wherein, if the predicted tower-load-moment indicative parameter is within the design limit, then a baseline operating control model is used by the control unit for normal operation of the wind turbine system;

wherein, if the predicted tower-load-moment indicative parameter exceeds the design limit, then a non-linear tower damping model is used by the control unit to determine a non-linear variable damping coefficient to prevent damage to the tower;

wherein the non-linear damping model is configured to generate a tower damping command in phase with the current fore-aft velocity of the tower; and wherein the tower damping command comprises a blade pitch angle alteration command.

* * * * *

UNITED STATES PATENT AND TRADEMARK OFFICE
CERTIFICATE OF CORRECTION

PATENT NO. : 9,587,629 B2  
APPLICATION NO. : 14/319269  
DATED : March 7, 2017  
INVENTOR(S) : Deshpande et al.

Page 1 of 1

It is certified that error appears in the above-identified patent and that said Letters Patent is hereby corrected as shown below:

In Column 12, Line 23, in Claim 2, delete "$\phi$ is" and insert -- $\omega$ is --, therefor.

Signed and Sealed this  
Sixth Day of June, 2017

Michelle K. Lee  
*Director of the United States Patent and Trademark Office*